(12) United States Patent
Ding et al.

(10) Patent No.: US 11,609,433 B2
(45) Date of Patent: Mar. 21, 2023

(54) HEAD-MOUNTED DISPLAY DEVICE WITH RESET MEMBER

(71) Applicant: GoerTek Technology Co., Ltd., Qingdao (CN)

(72) Inventors: Li Ding, Qingdao (CN); Guocheng Zhang, Qingdao (CN); Lichao Chen, Qingdao (CN); Xiaofei Zhou, Qingdao (CN); Chongguang Chen, Qingdao (CN); Gang Jing, Qingdao (CN)

(73) Assignee: Goertek Technology Co. Ltd., Qingdao (CN)

( * ) Notice: Subject to any disclaimer, the term of this patent is extended or adjusted under 35 U.S.C. 154(b) by 111 days.

(21) Appl. No.: 17/263,239

(22) PCT Filed: Sep. 19, 2018

(86) PCT No.: PCT/CN2018/106555
§ 371 (c)(1),
(2) Date: Jan. 26, 2021

(87) PCT Pub. No.: WO2020/019459
PCT Pub. Date: Jan. 30, 2020

(65) Prior Publication Data
US 2021/0157154 A1    May 27, 2021

(30) Foreign Application Priority Data
Jul. 26, 2018   (CN) .......................... 201810837623.2

(51) Int. Cl.
*G02B 27/01* (2006.01)
*H04N 21/422* (2011.01)

(52) U.S. Cl.
CPC ... *G02B 27/0176* (2013.01); *H04N 21/42204* (2013.01); *G02B 2027/0156* (2013.01); *G02B 2027/0178* (2013.01)

(58) Field of Classification Search
CPC ........ G02B 27/0176; G02B 2027/0156; G02B 2027/0178; H04N 21/42204
See application file for complete search history.

(56) References Cited

U.S. PATENT DOCUMENTS

| 2010/0079356 | A1 | 4/2010 | Hoellwarth |
| 2014/0152531 | A1* | 6/2014 | Murray ................... G06F 3/012 345/8 |

(Continued)

FOREIGN PATENT DOCUMENTS

| CN | 104503584 A | 4/2015 |
| CN | 205643856 U | 10/2016 |

(Continued)

*Primary Examiner* — Kwang-Su Yang
(74) *Attorney, Agent, or Firm* — Baker Botts LLP

(57) ABSTRACT

The present disclosure relates to a head-mounted display device, comprising a device body, a front cover and a remote controller, wherein one end of the device body is a display end, the front cover is disposed on the device body and is opposite to the display end, and he front cover and the display end enable a display to be inserted therebetween when in use; and wherein the front cover is provided with a through hole opposite to the display end, in which the remote controller can be received and fixed. One technical effect of the present disclosure is that the remote controller herein is easy to store and can be carried integrally with the device body.

18 Claims, 11 Drawing Sheets

(56) References Cited

U.S. PATENT DOCUMENTS

2016/0091877 A1* 3/2016 Fullam .................... G09G 3/00
  700/275
2018/0292666 A1* 10/2018 Kong .................... G06F 3/0346

FOREIGN PATENT DOCUMENTS

| CN | 106104361 A | 11/2016 |
| CN | 208737101 U | 4/2019 |

* cited by examiner

HEAD-MOUNTED DISPLAY DEVICE WITH RESET MEMBER

CROSS-REFERENCES TO RELATED APPLICATIONS

This application claims priority to Chinese Patent Application No. 201810837623.2, filed with the Chinese Patent Office on Jul. 26, 2018 and entitled "HEAD-MOUNTED DISPLAY DEVICE", the content of which is incorporated herein by reference in its entirety.

TECHNICAL FIELD

The present disclosure relates to the technical Held of electronic products, and more specifically to a head-mounted display device.

BACKGROUND

Head-mounted display device, also called as video glass, eye-type display or portable theater, can realize playing of multimedia files including 3D video and the like, achieves an immersive cinema effect using the near-eye display technology, and commercializes the concept of a portable home theater. Various head-mounted display devices may be worn by a user to send optical signals to its eyes so as to realize different effects such as virtual reality (VR), augmented reality (AR) and mixed reality (MR).

In the prior art, with the development and technological advancement of head-mounted display devices, the devices are becoming more and more intelligent, especially, a head-mounted display device using a mobile phone as a display medium has emerged. Although more and more head-mounted display devices are equipped with a remote controller to increase the user experience, a remote controller designed to be separate from a head-mounted display device tends to be forgotten after use, and is not convenient to store and carry. For a head-mounted display device with a fixed front cover, due to its structural characteristics, one side of the inner housing near the display is difficult to clean and tends to receive foreign objects which may even cause wear and tear to the inserted display. Meanwhile, a display device in a fixed front cover, such as a mobile phone or the like, has a low heat dissipation efficiency due to the limited space, which is prone to cause overheat of the display and the head-mounted display device, resulting in unfavorable user experience such as system crash of the device, or overheat of the display and the head-mounted display device that causes damage to the user's body.

Therefore, it is necessary to provide an improved head-mounted display device.

SUMMARY

An object of the present disclosure is to provide a new technical solution for a head-mounted display device.

According to an aspect of this disclosure, a head-mounted display device is provided, comprising a device body, a front cover and a remote controller, wherein one end of the device body is a display end, the front cover is disposed on the device body and is opposite to the display end, and the front cover and the display end enable a display to be inserted therebetween when in use;

and wherein the front cover is provided with a through hole opposite to the display end, in which the remote controller can be received and fixed.

Optionally, the device body has a housing to which the front cover is fixedly connected, and a gap is provided between the front cover and the display end for the display to be inserted;

or, the front cover is movably connected to the device body, the front cover is capable of being moved to a storage position close to the display end and a working position tar away from the display end, and the gap between the front cover and the display end is capable of receiving the display when the front cover is in the working position.

Optionally, the front cover is slidably connected with the device body, a reset member is further disposed between the front cover and the device body, and the reset member drives the front cover to move toward the storage position.

Optionally, the front cover is slidably connected with the device body, at least the front cover is provided with a chamfer on one side opposite to an insertion direction of the display, and when the display is inserted into the gap, the display moves the front cover to a working position by driving the chamfer.

Optionally, when the remote controller is fixed in the through hole, the remote controller protrudes from the front cover on one side facing the display end and is located on an insertion route of the display.

Optionally, one side of the remote controller facing the display end is provided with a matching portion that matches with the display and is located on an insertion route of the display, and when the display is inserted into the gap, the display pushes the remote controller away from the through hole by driving the matching portion.

Optionally, the matching portion is symmetrically arranged on one side of the remote controller facing the display end.

Optionally, an avoidance portion is provided on the display end, and the avoidance portion avoids the remote controller.

Optionally, the through hole conforms to a shape of the remote controller, and the remote controller is fixed in the through hole to close the through hole.

Optionally, a sliding pin mechanism is provided in at least one side of the through hole, a sliding pin of the sliding pin mechanism is slidably arranged on the front cover, and when the remote controller is fixed in the through hole, the remote controller is locked by the sliding pin.

Optionally, one end of the sliding pin that locks the remote controller has an inclined surface or an arc surface and is matched with one side of the remote controller facing the display end, and when the remote controller is installed into the through hole, the remote controller drives the inclined surface or the arc surface to slide the sliding pin in a direction away from the through hole.

Optionally, the sliding pin mechanism further comprises an elastic member, and the clastic member is disposed in the front cover to drive the sliding pin to slide into the through hole.

Optionally, the sliding pin mechanism further comprises a toggle member, the toggle member is rotatably connected in the front cover and connected with the sliding pin, and when the toggle member rotates, the toggle member can drive the sliding pin to slide.

Optionally, one end of the toggle member faces the display end and is located on an insertion route of the display, and when the display is inserted, the display is capable of toggling the toggle member to drive the sliding pin to slide in a direction away from the through hole.

Optionally, a pushing member is provided on the front cover, wherein the pushing member is exposed, and the pushing member is connected with the sliding pin and capable of driving the sliding pin to slide.

Optionally, sliding pin mechanisms are symmetrically arranged on two opposite sides of the through hole.

Optionally, at least one side of the through hole is provided with a damping member, the remote controller is located in the through hole, and the remote controller is fixed by an action force generated between the damping member and the remote controller.

Optionally, a limiting mechanism for cooperation with each other is provided between the through hole and the remote controller, and the limiting mechanism limits a position where the remote controller is disposed in the through hole.

Optionally, the damping member is a rubber layer or a silicone layer.

Optionally, the damping member is annularly provided on an inner side of the through hole.

Optionally, the damping member is correspondingly provided on the remote controller.

Optionally, the damping member is a rubber layer, a silicone layer or a magnet.

Optionally, one side of the remote controller is capable of being rotatably connected with one side of the through hole.

Optionally, a rotating portion capable of rotating is provided on one side of the through hole, one side of the remote controller is clamped with the rotating portion, and the remote controller rotates with the rotation of the rotating portion.

Optionally, a fixing pin is provided on the rotating portion, one side of the remote controller is provided with a fixing portion that cooperates with the fixing pin, and the fixing portion enables the fixing pin to be inserted into the fixing portion.

Optionally, the head-mounted display device further comprises a strap, wherein the remote controller is fixed on the front cover by the strap.

Optionally, perforation holes are provided on the two opposite sides of the through hole, one end of the strap goes in through one perforation hole and goes out through another perforation hole, and both ends of the strap are fixedly connected to fix the remote controller in the through hole.

Optionally, one end of the strap is provided with a fixing sleeve that adapts to a cross section of the remote controller, the fixing sleeve is sleeved on the remote controller, and another end of the strap goes in through one perforation hole and goes out through another perforation hole.

Optionally, both ends of the strap are fixedly connected by a Velcro or a buckle.

One technical effect of the present disclosure is that the remote controller in the present disclosure is easy to store and can be carried integrally with the device body.

Other features and advantages of the present disclosure will become clear through the following detailed description of exemplary embodiments of the present disclosure with reference to the accompanying drawings.

BRIEF DESCRIPTION OF THE DRAWINGS

The drawings constituting a part of the specification describe the embodiments of the present disclosure, and together with the specification, serve to explain the principle of the present disclosure.

Figure 1:
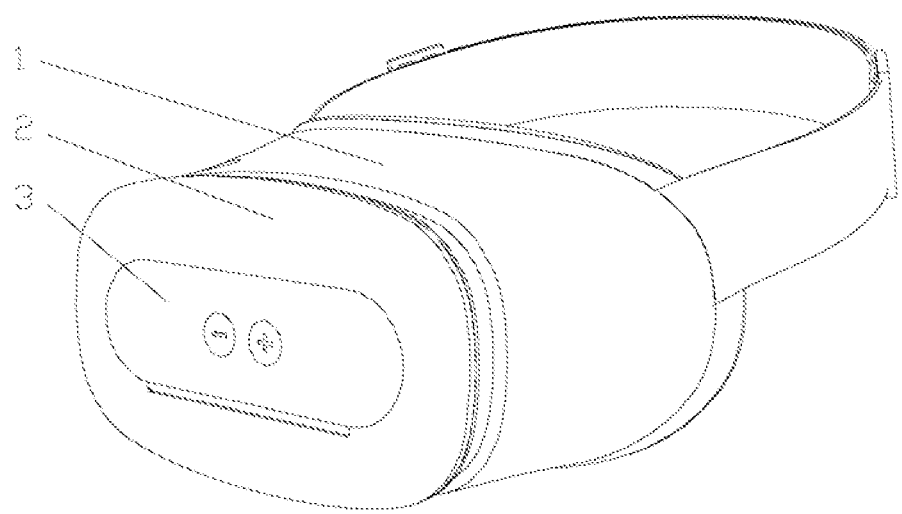
FIG. 1 is a schematic appearance structural diagram of some embodiments.

wherein: 1 device body, 11 display end, 12 gap, 13 sliding pin, 14 elastic member, 15 toggle member, 16 pushing member, 17 rotating portion, 18 avoidance portion, 19 fixing pin, 110 damping member, 2 front cover, 21 through hole, 3 remote controller, 31 first fixing portion, 4 display, 5 strap, 51 fixing sleeve.

DETAILED DESCRIPTION

Various exemplary embodiments of the present disclosure will now be described in detail with reference to the accompanying drawings. It should be noted that unless specifically stated otherwise, the relative arrangement of components and steps, numerical expressions and numerical values set forth in these embodiments do not limit the scope of the present disclosure.

The following descriptions to at least one exemplary embodiment are actually only illustrative, and is in no way intended to limit the present disclosure and its application or use.

The technology and equipment known to those of ordinary skill in the relevant fields may not be discussed in detail, but where appropriate, the technology and equipment should be regarded as part of the specification.

In all examples shown and discussed herein, any specific values should be interpreted as exemplary only and not as limitations. Therefore, other examples of the exemplary embodiment may have different values.

It should be noted that similar reference numerals and letters indicate similar items in the following drawings, so once an item is defined in one drawing, it docs not need to be further discussed in the subsequent drawings.

A head-mounted display device provided by the present disclosure, as shown in FIGS. 1-23, comprises a device body 1, a front cover 2 and a remote controller 3. One end of the device body 1 is a display end 11. The front cover 2 is provided on the device body 1. The front cover 2 is opposite to the display end 11 of the device body 1. When in use, the display 4 can be inserted between the front cover 2 and the display end 11. The display 4 may be a terminal display device such as a mobile phone or a PSP, or a dedicated display device matched with the device body 1, which is not limited in this application, as long as the display 4 can be used in conjunction with the device body 1, such that the user can watch the picture sent by the display 4 through the device body 1. The front cover 2 has a through hole 21, and the front cover 2 is a hollow structure. The through hole 21 is opposite to the display end 11. The through hole 21 can receive and fix the remote controller 3. The remote controller 3 can be fixed in the through hole 21 by means of clamping, sandwiching, adsorption or the like, or by means of other independent fixing structure as long as the remote controller can be received and fixed. The arrangement of the through hole 21 enables the remote controller 3 of the head-mounted display device to be stored easily, which improves the space utilization rate of the device, and to be carried integrally with the device body 1, which reduces the possibility of the remote controller 3 being lost. On the other hand, the arrangement of the through hole 21 enables the cleaning means to directly pass through the through hole 21 to maintain and clean the area between the device body 1 and the front cover 2, thus solving the problem of inconvenient cleaning for the dirt. On another hand, when the display 4 is used in the gap 12, the remote controller 3 is removed from the through hole 21 for the control, and then the through hole 21 is configured such that the back of the display 4 can directly contact the outside air, which can improve the heat dissipation efficiency, and thus effectively solve the problems caused by poor heat dissipation such as overheating.

Figure 5:
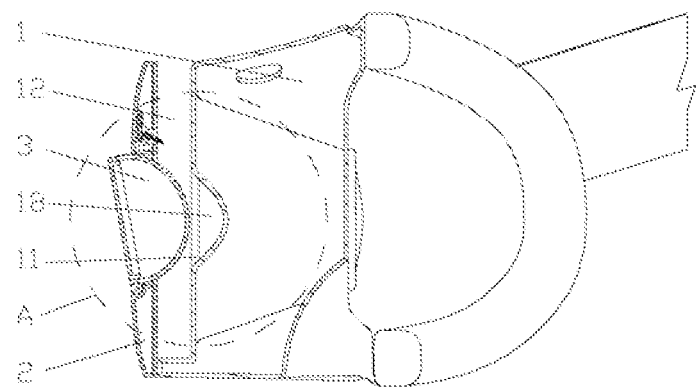
FIG. 5 is a schematic cross-sectional diagram of embodiment 1.
Figure 6:
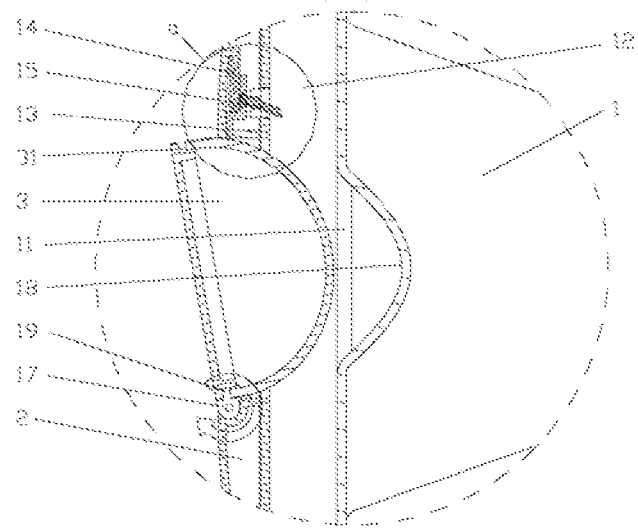
FIG. 6 is a partial enlarged schematic diagram at A in FIG. 3.

In some embodiments, the device body 1 has a housing that receives an optical component. The optical component can transmit the light emitted by the display 4 received by the display end 11 to the eyes of the user at a wearing end through an optical path to present an image. The front cover 2 is fixedly connected with the housing of the device body 1, and may be made by an integral molding, which can improve its structural strength and simplify the processing technology, thereby forming a head-mounted display device with a fixed front cover. It may also be that the front cover 2 and the housing are fixedly connected by bonding, ultrasonic welding, or the like, which is not limited in this application. As shown in FIG. 5, there is a fixed gap 12 between the front cover 2 and the display end 11, and the gap 12 is used for the display 4 to be inserted. In some other embodiments, the front cover 2 is also detachably installed on the housing, which is convenient for disassembly and maintenance, as long as the through hole 21 provided thereon can receive and fix the remote controller 3, which is not limited in this application.

Figure 3:
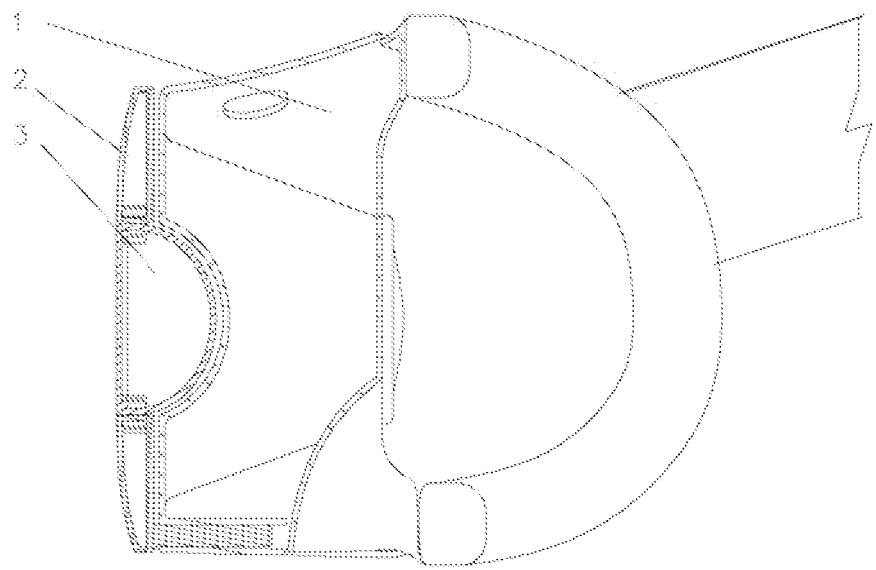
FIG. 3 is a schematic cross-sectional structural diagram of some embodiments.
Figure 4:
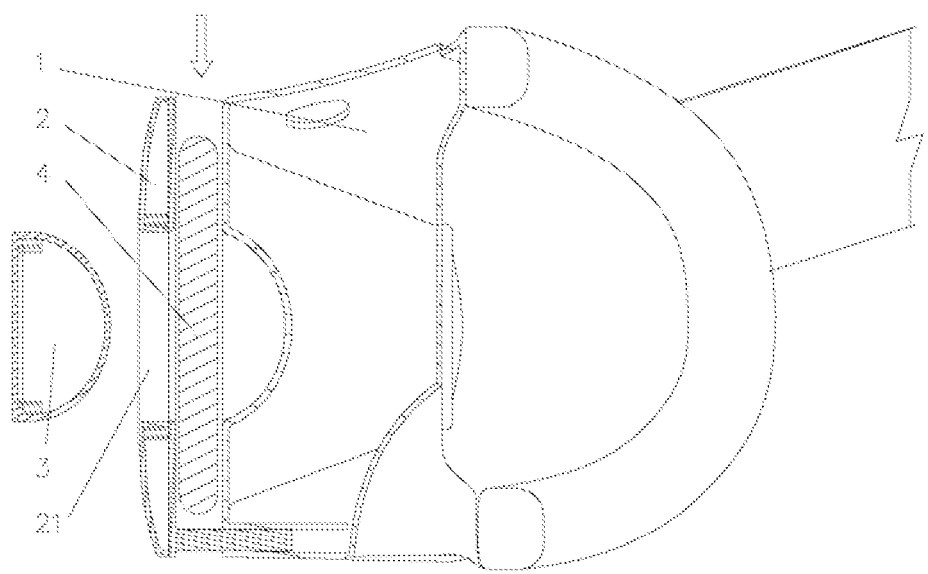
FIG. 4 is a schematic diagram of the take-out process of some embodiments.

In some embodiments, as shown in FIGS. 3 and 4, the front cover 2 is movably connected with the device body 1. The movable connection may be that the front cover 2 is slidably disposed on the device body, or may be connection by an elastic band or the like, so that the front cover 2 may move relative to the display end 11. And it is possible, as long as the distance between the front cover 2 and the display end 11 is variable. The front cover 2 can be moved to a storage position close to the display end 11. When the head-mounted display device does not need to be used, the front cover 2 is adjusted to the storage position, such that the front cover 2 is as close to the display end 11 as possible, reducing the gap 12 between the front cover and the display end, so that the volume of the head-mounted display device can be reduced, which is convenient for carrying and storing. Then, the remote controller 3 is further stored in the through hole 21 to improve the space utilization rate and reduce the carrying volume. The front cover 2 can also be moved to a working position far away from the display end 11. When the head-mounted display device needs to be used, the front cover 2 is adjusted to the working position so that the gap 12 can receive the display 4, so that the head-mounted display device can be in a normal working state.

Further, when the front cover 2 is slidably disposed on the device body 1, a reset member is further disposed between the front cover 2 and the device body 1, and the reset member drives the front cover 2 to move toward the storage position. When the head-mounted display device is in operation, the driving force of the reset member can make the front cover 2 and the display end 11 sandwich the display 4, which can better fix the display 4 and improve the structural stability of the head-mounted display device. Further, the reset member may be a structural member, such as a spring, capable of exerting a force. Those skilled in the art can also understand that the direct connection between the front cover 2 and the display end 11 through elastic bands or the like can also achieve the above effects.

Further, when the front cover 2 is slidably disposed on the device body 1, at least the front cover 2 is provided with a chamfer on one side opposite to an insertion direction of the display 4, such that the front cover 2 is capable of being driven to a working position by driving the chamfer through the display 4 when inserted into the display 4, which improves the convenience of installation of the display 4 without requiring to adjust the front cover 2 to the working position in advance. Especially when a reset member is provided, if the chamfer is not provided, the force of the reset member needs to be manually overcome first, and then the display 4 is inserted in a holding stale, which increases the operation intensity and operation steps during use, and reduces the user experience. The structure of the present disclosure can effectively reduce the operation steps when using the present disclosure, and improve the convenience and the user experience.

In some embodiments, such as in the embodiments shown in FIGS. 1-23, when the remote controller 3 is fixed in the through hole 21, that is, when the display 4 is not in use, the display 4 is not in the gap 12. The remote controller 3 protrudes from the front cover 2 on one side facing the display end 11 and is located on an insertion route of the display 4. When the front cover 2 and the device body 1 are integrally formed, and the gap 12 is kept fixed, the space utilization rate of the gap 12 can be improved, and the space of the gap 12 can be fully utilized when in use or not in use. On the other hand, when the volume of the remote controller 3 is relatively large, there is no need to consider too much about the installation space for the remote controller 3 to increase the volume of the device. In addition, the remote controller 3 protrudes from the front cover 2 on one side facing the display end 11, and the insertion process of the display 4 can be linked with the take-out process of the remote controller 3 through the matching arrangement, which simplifies the operation steps of the head-mounted display device, thus improving the user experience.

Further, in some embodiments, as shown in FIGS. 3-21, the remote controller 3 has a matching portion that matches with an insertion route of the display 4 on one side facing the display end 11, so that when the display 4 is reinserted, the remote controller 3 can be taken out meanwhile, which simplifies the steps and improves the efficiency of the head-mounted display device when it is ready for use. The matching portion may be an arc structure or an inclined structure. Further, the matching portion is symmetrically arranged on one side of the remote controller 3 facing the display end 11. The cross section of the remote controller 3 may be of a symmetrical structure such as an arc shape, an isosceles trapezoid shape, etc., so as to improve the symmetrical aesthetics and the convenience of installation, without deliberately distinguishing the directions.

Further, an avoidance portion 18 is provided on the display end 11 to avoid the remote controller 3. When the volume of the remote controller 3 is relatively large, it avoids obstructing the installation of the remote controller 3 and reserves sufficient installation space.

Figure 2:
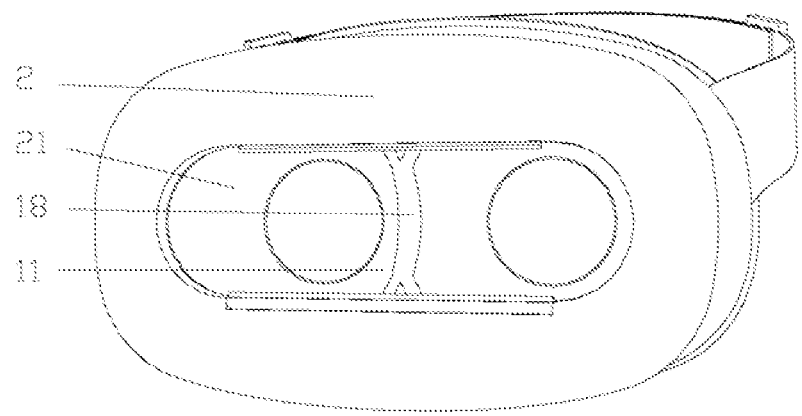
FIG. 2 is a schematic structural diagram of some embodiments.
Figure 11:
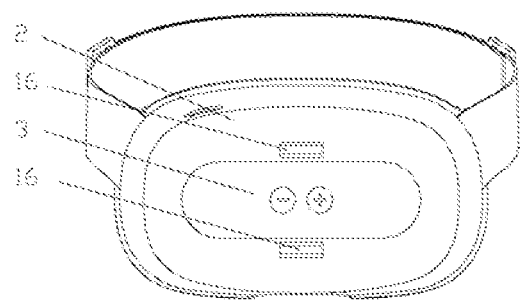
FIG. 11 is a schematic front view structural diagram of embodiment 2.
Figure 12:
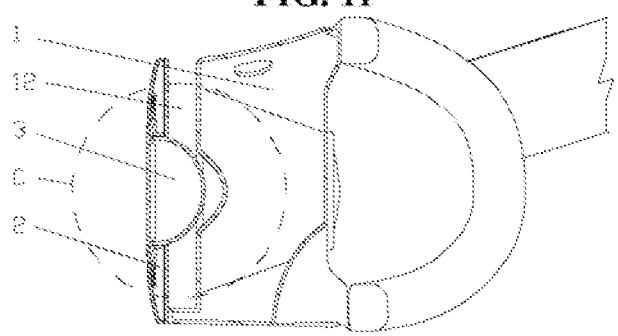
FIG. 12 is a schematic cross-sectional structural diagram of embodiment 2.
Figure 13:
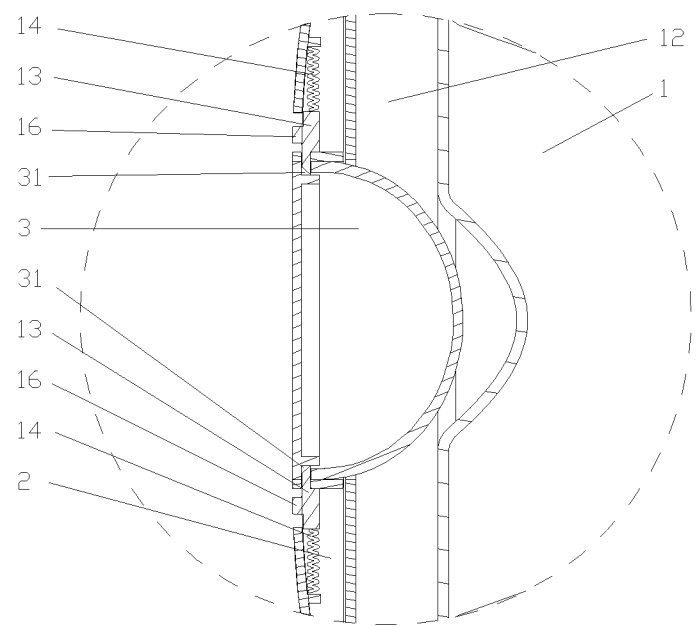
FIG. 13 is a partial enlarged schematic diagram at C in FIG. 10.
Figure 14:
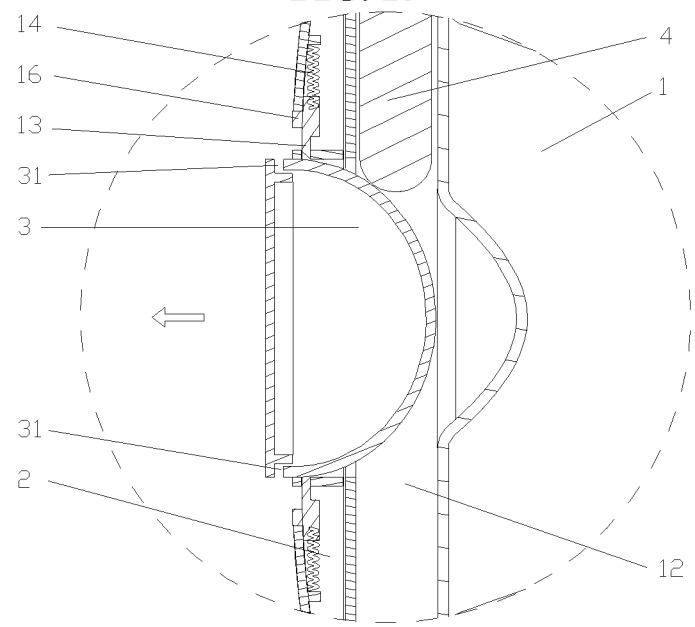
FIG. 14 is a schematic diagram of the take-out process at C in FIG. 10.
Figure 15:
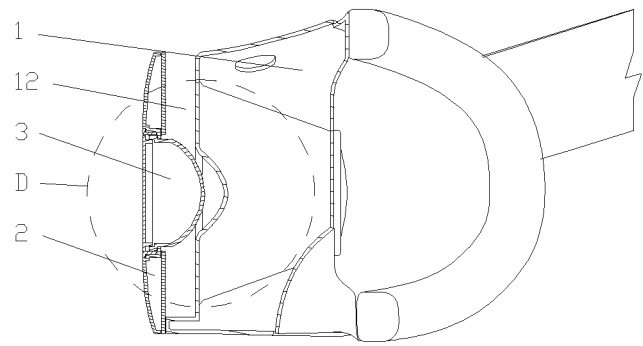
FIG. 15 is a schematic cross-sectional structural diagram of embodiment 3.
Figure 16:
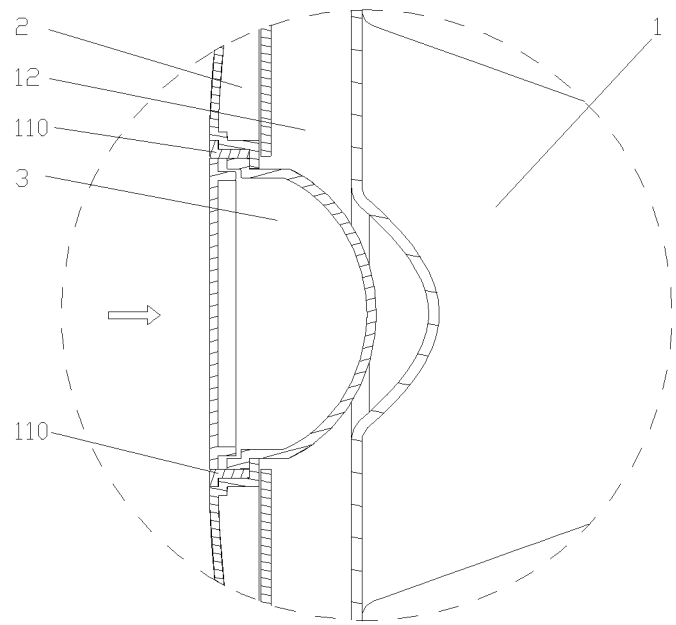
FIG. 16 is a partial enlarged schematic diagram at D in FIG. 13.
Figure 17:
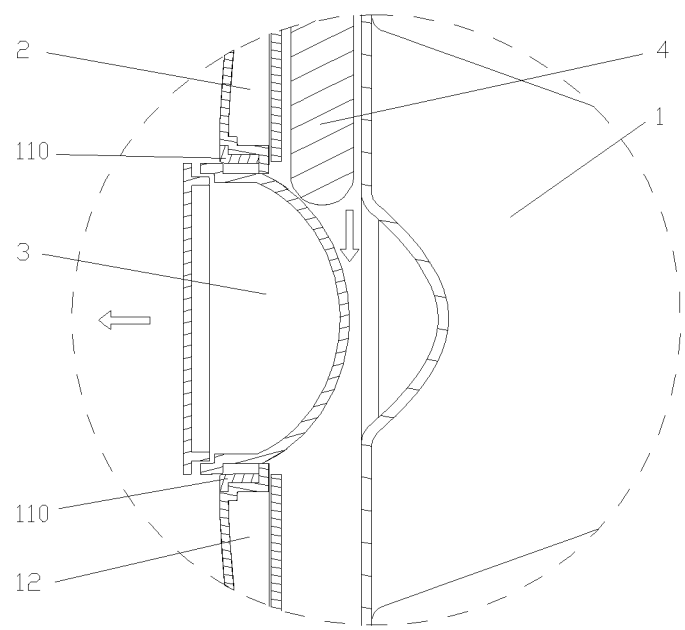
FIG. 17 is a schematic diagram of the take-out process at D in FIG. 13.
Figure 18:
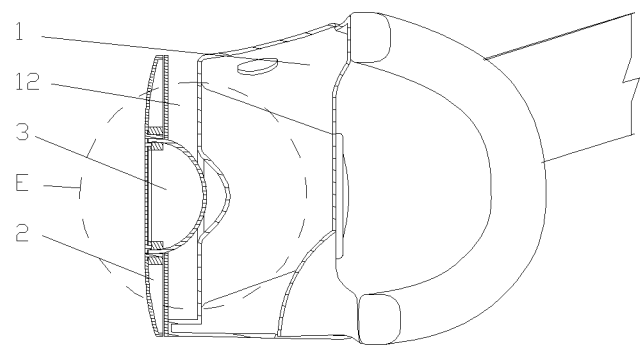
FIG. 18 is a schematic cross-sectional structural diagram of embodiment 4.

In some embodiments, as shown in FIG. 1, FIG. 2, and FIG. 11, the through hole 21 conforms to the shape of the remote controller 3, the remote controller 3 is clamped on the through hole 21 to close the through hole 21, which can improve the aesthetics of the head-mounted display device, and can prevent foreign objects from falling into the gap 12 through the through hole 21.

In some embodiments, the head-mounted display device may comprise a plurality of remote controllers 3. The through hole 21 may correspond to the remote controller 3 one by one.

In some embodiments, as in embodiment 1 and embodiment 2 shown in FIGS. 5-14, a sliding pin mechanism is provided in at least one side of the through hole 21. The sliding pin 13 of the sliding pin mechanism is slidably disposed on the front cover 2. One end of the sliding pin 13 can slide into the through hole 21. The remote controller 3 is correspondingly provided with a first fixing portion 31 that cooperates with the sliding pin 13. When the sliding pin 13 is of cylindrical shape, the first fixing portion 31 may be a matching concave hole. When the sliding pin 13 is of a horizontal bar shape, the first Fixing portion 31 may be a matching groove. Those skilled in the art can design the shape of the sliding pin 13 and the first fixing portion 31 being cooperating with the sliding pin as required, which is not limited in this application. When the remote controller 3 is fixed in the through hole 21, the sliding pin 13 can be inserted into the first fixing portion 31 to fix the remote controller 3. When the present disclosure is in use, as shown in embodiment 1, a sliding pin mechanism may be used in conjunction with other mechanisms to fix the remote controller 3 in the through hole 21, and it is also possible to fix the remote controller 3 in the through hole 21 only by a sliding pin mechanism as shown in the embodiment 2. On this basis, those skilled in the art can readily envisage that a single fixing mechanism may be used to fix the remote controller 3, or a combination of a plurality of fixing mechanisms may be used to Fix the remote controller 3, which is not limited by this application and will not be repeated hereafter. The sliding pin 13 is used to fix the remote controller 3. While fixing the remote controller 3, the sliding pin also has a limit function for the remote controller 3. Thus having a good fixing effect and a high stability. In addition, the sliding pin mechanism is easy to design to form a linkage relationship with some actions, which can simplify the take-out steps of the remote controller 3 while being firmly fixed, and improve the convenience of placing and taking out the remote controller.

Further, as shown in embodiment 1 and embodiment 2, one end of the sliding pin 13 inserted into the first fixing portion 31 has an inclined surface or an arc surface. The inclined surface or arc surface is matched with one side of the remote controller 3 facing the display end 11, that is, the inclined surface or arc surface intersects an installation direction of the remote controller 3, so that when the remote controller 3 moves from the outside of the through hole 21 to the direction close to the display end 11, the sliding pin 13 can be pushed to move by the remote controller 3 contacting the inclined surface or arc surface, to avoid the remote controller 3, which will not prevent the remote controller 3 from being installed in the through hole 21. Thus, there is no need to move the sliding pin 13 in advance for avoiding, which simplifies the installation steps of the remote controller 3. In some other embodiments, it is also possible not to provide an inclined surface or an arc surface, but it is possible to manually drive the sliding pin 13 to slide for avoiding, which is not limited in this application.

Further, as shown in embodiment 1 and embodiment 2, the sliding pin mechanism further comprises an elastic member 14. The elastic member 14 is disposed in the front cover 2 to drive the sliding pin 13 to slide into the through hole 21. When the sliding pin 13 is directly facing the first fixing portion 31, the sliding pin 13 can be clamped into the first fixing portion 31 under an action of elastic force. For the compression of the elastic member 14, it may be driven by driving the sliding pin 13 through an inclined surface or arc surface as described above or may be manually driven, or the elastic member is compressed by driving the sliding pin 13 through other structures, which is not limited in this application.

Figure 7:
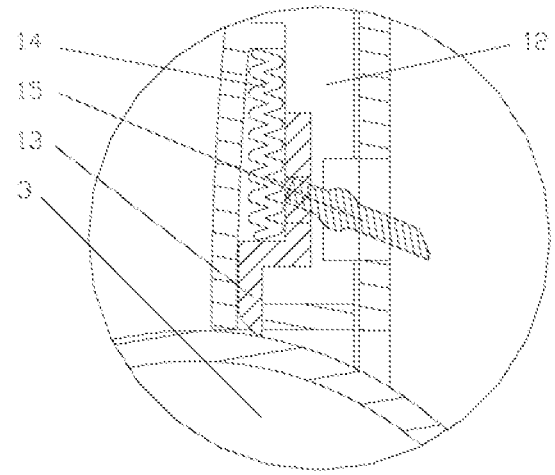
FIG. 7 is a partial enlarged schematic diagram at a in FIG. 4.
Figure 8:
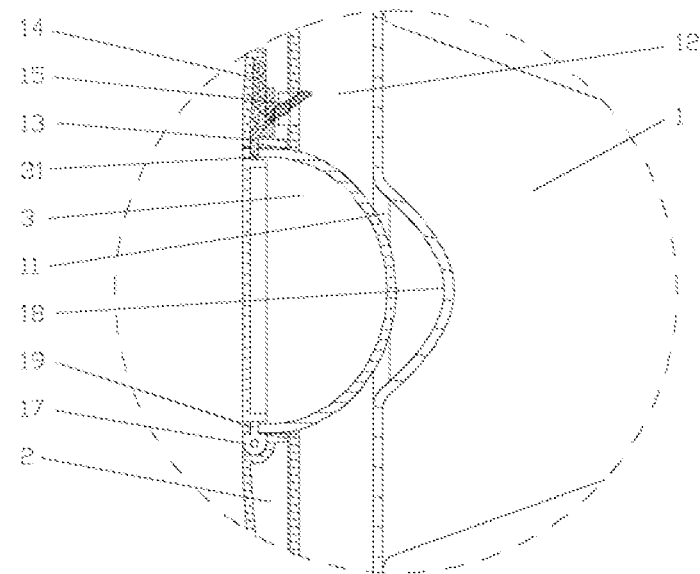
FIG. 8 is a schematic diagram of the fixing effect at A in FIG. 3.
Figure 9:
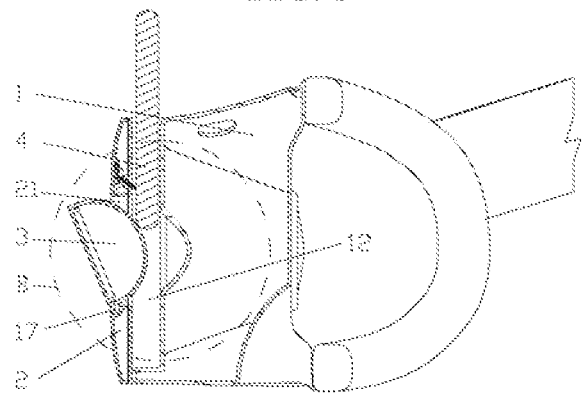
FIG. 9 is a schematic diagram of the take-out process of embodiment 1.
Figure 10:
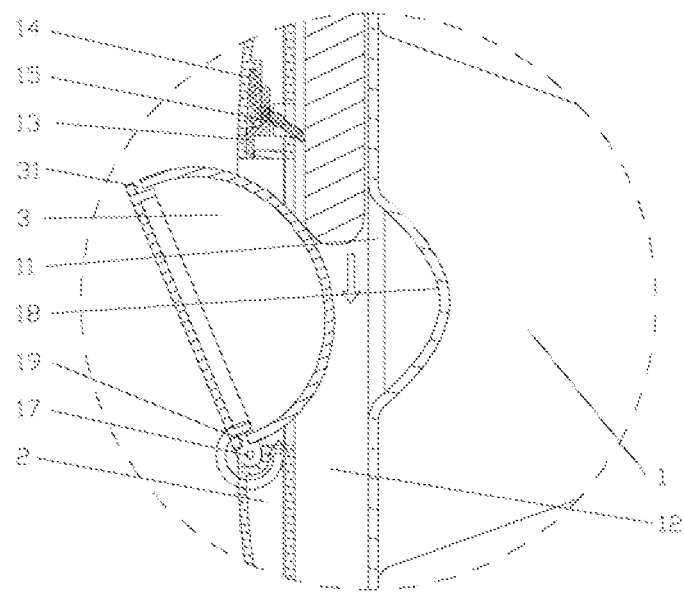
FIG. 10 is a partial enlarged schematic diagram at B in FIG. 7.

Further, as shown in FIG. 7, the sliding pin mechanism further comprises a toggle member 15. The toggle member 15 is rotatably connected in the front cover 2. The toggle member 15 is connected to the sliding pin 13, and when the toggle member 15 rotates, the sliding pin 13 can be driven to slide, so that the sliding pin 13 is driven to be separated from or inserted into the first fixing portion 31 by the toggle member 15. In contrast, when the sliding pin 13 slides, it can also drive the toggle member 15 to rotate.

Further, as shown in FIG. 1, a head-mounted display device is provided with a sliding pin 13 and a toggle member 15 connected to the sliding pin 13. One end of the toggle member 15 toward the display end 11 is disposed in the gap 12 and is located on an insertion route of the display 4. The remote controller 3 can be unlocked only when the display 4 is inserted, which improves the security of fixing the remote controller 3 and prevents the remote controller 3 from being unfixed by an accidental touch. The insertion process of the display 4 can be linked with the take-out process of the remote controller 3 to improve the convenience of taking out the remote controller 3.

Further, as shown in FIGS. 11-14, a pushing member 16 is provided on the front cover 2, wherein the pushing member 16 is exposed. The pushing member 16 is connected with the sliding pin 13 and can drive the sliding pin 13 to slide, which is convenient for the user to directly drive the sliding pin 13 to slide manually, and can control the sliding position of the sliding pin 13. Further, the pushing member 16 can be integrally formed with the sliding pin 13 or connected by welding or the like. Further, a guide groove may be provided on the front cover 2, the pushing member 16 passes through the guide groove and is provided on the sliding pin 13. The pushing member 16 can slide along the guide groove to drive the sliding pin 13 to slide in the front cover 2.

In some embodiments, as shown in FIGS. 11-14, sliding pin mechanisms are symmetrically arranged on both sides of the through hole 21 to achieve complete fixation of the remote controller 3. Of course, the remote controller 3 may also be Fixed by a symmetrical arrangement in cooperation with other mechanisms, which is not limited by this application.

In some embodiments, such as in embodiment 3 and embodiment 4 shown in FIGS. 15-19, a damping member 110 is provided on at least one side of the through hole 21. The remote controller 3 is located in the through hole 21 and the remote controller 3 is fixed by an action force generated between the damping member 110 and the remote controller 3. The remote controller 3 may be Fixed in the through hole 21 by a force, such as friction force, adsorption force or the like. For example, in embodiment 3, when the damping member 110 is a rubber layer or a silicone layer, the remote controller 3 is fixed in the through hole 21 by a friction force provided by the clamping of the damping member 110 to the remote controller 3.

Further, when the damping member 110 is a rubber layer or a silicone layer, the damping member may surround the through hole 21 and be annularly provided on the inner side of the through hole 21, thereby the scaling performance between the through hole 21 and the remote controller 3 is improved during the installation.

Further, a limiting mechanism for cooperation with each other may be provided between the through hole 21 and the remote controller 3, thus limiting the position where the remote controller 3 is disposed in the through hole 21, so as to prevent it from being too close to the display end 11 and prevent causing the difficulty in disassembly. The limiting mechanism may be a limiting baffle. Those skilled in the art can understand that the aforementioned sliding pin mechanism itself also has an effect of limiting and fixing. That is to say, the sliding pin mechanism can be used alone, or can be used in conjunction with the damping member provided on the same side of the through hole 21 to improve the stability of its fixation, which is not limited by this application.

Further, a partial depression may be provided in an edge area of the through hole 21 to facilitate manual grasping of the edge of the remote controller 3 through the depression to take out the remote controller 3 from the through hole 21.

Figure 19:
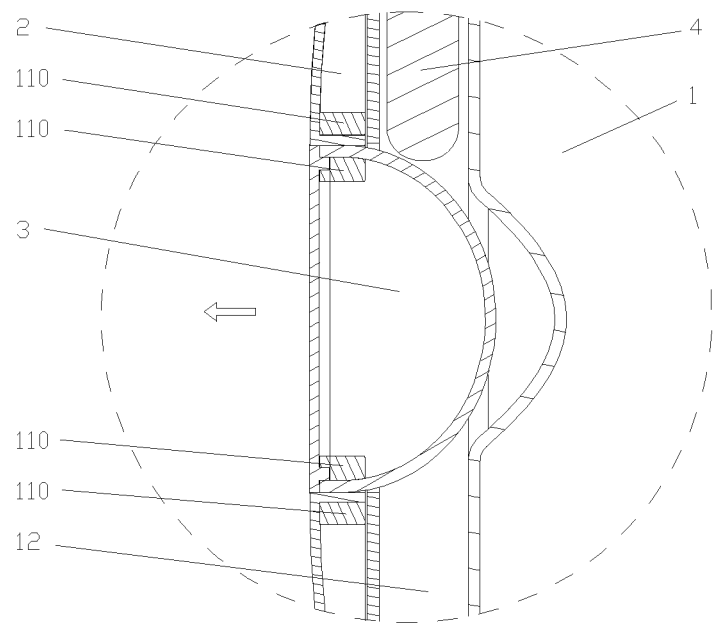
FIG. 19 is a schematic diagram of the take-out process at E in FIG. 16.
Figure 20:
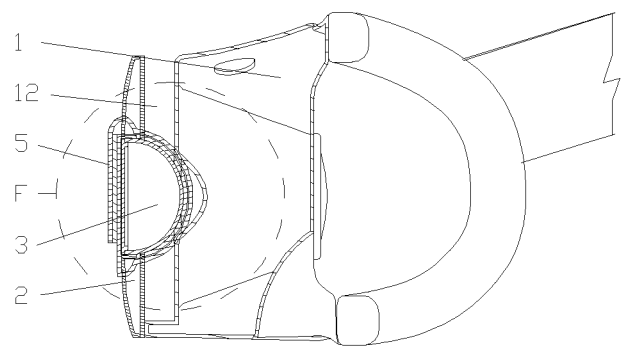
FIG. 20 is a schematic cross-sectional structural diagram of embodiment 5.

Further, as shown in FIG. 19, the damping member 110 is correspondingly provided on two opposite sides of the remote controller 3. The force is strengthened by the interaction between the damping members 110 on the through hole 21 and on the remote controller, thus improving its fixing effect. In addition, when a friction force is used for fixing, the damping members 110 may be made of different materials as long as the friction force between them can be increased, which is not limited in this application. Further, the two corresponding damping members 110 shown in FIG. 19 can be magnets, and it is also possible to fix the remote controller 3 by the attractive force of the magnets. Compared with other damping members, the effect of the magnet is stable, even with the extension of the lime, its force does not attenuate or attenuates very little, such that the durability of the present disclosure is greatly improved.

Further, the damping member 110 may be configured to be detachable to improve the durability of the present disclosure and facilitate replacement and maintenance.

In some embodiments, as in embodiment 1 shown in FIGS. 5-10, one side of the remote controller 3 is rotatably connected with one side of the through hole 21. When the remote controller 3 is placed in the through hole 21 or taken out from the through hole 21, the remote controller can be screwed in or out by rotating, which is convenient for the operation. Such a rotation connection may be configured such that when the remote controller 3 rotates to a preset angle, the remote controller 3 and the through hole 21 can be actively or passively separated. Further, it is possible to limit the remote controller 3 to only be able to rotate relative to the through hole 21 within a certain angle range by means of position limitation and the like, so as to locate a separation position of the remote controller 3 and the through hole 21. And in some embodiments, it is also passible to prevent the remote controller 3 from being directly separated from the through hole 21 and falling and being damaged. Further, at other positions inside the through hole 21, other mechanisms may be provided to fix the remote controller 3, such as a sliding pin mechanism shown in embodiment 1, a damping member shown in embodiment 3 and embodiment 4 or the like, which is not limited in this application.

Further, in the embodiment 1 as shown in FIGS. 5-10, a rotating portion 17 capable of rotating is provided on one side of the through hole 21. One side of the remote controller 3 is clamped with the rotating portion 17, and the remote controller 3 rotates with the rotation of the rotating portion 17. For example, a fixing pin 19 is provided on the rotating portion. The fixing pin 19 rotates with the rotation of the rotating portion, and protrudes in a radial direction of the rotating shaft. One side of the remote controller 3 is provided with a second fixing portion that cooperates with the fixing pin 19 and can be clamped on the fixing pin 19. The fixing pin 19 and the second fixing portion may have the same matching relationship as the sliding pin 13 and the first fixing portion 31, except that the fixing pin 19 is relatively fixed and cannot slide. Further, in embodiment 1, the second fixing portion may be the same as the first fixing portion 31, so that the remote controller 3 is symmetrically arranged, thereby there is no need to deliberately distinguish the clamping direction during installation. The fixing pin 19 may be the same as or different from the sliding pin 13, as long as it can be clamped. Preferably, the fixing pin 19 and the sliding pin 13 have the same width, so that the remote controller 3 can be effectively fixed in the circumferential direction of rotation. In some other embodiments, the above-mentioned damping member 110 or other fixing mechanism may be provided on one opposite side of the rotating portion 17, which can also implement the present disclosure, and this is not limited in the present application.

In some other embodiments, a rotating portion 17 capable of rotating may be provided on one side of the remote controller 3. Both ends of the rotating portion 17 can be clamped with one side of the through hole 21, and the remote controller 3 rotates around the rotating portion 17 as an axis. Alternatively, one side of the through hole 21 is provided with an inner groove and one side of the remote controller 3 is provided with an arc protrusion that cooperates with the inner groove. The protrusion can be screwed into the inner groove and rotated about the protrusion as an axis, and thus the rotational connection may also be achieved, which is not limited in this application.

Figure 21:
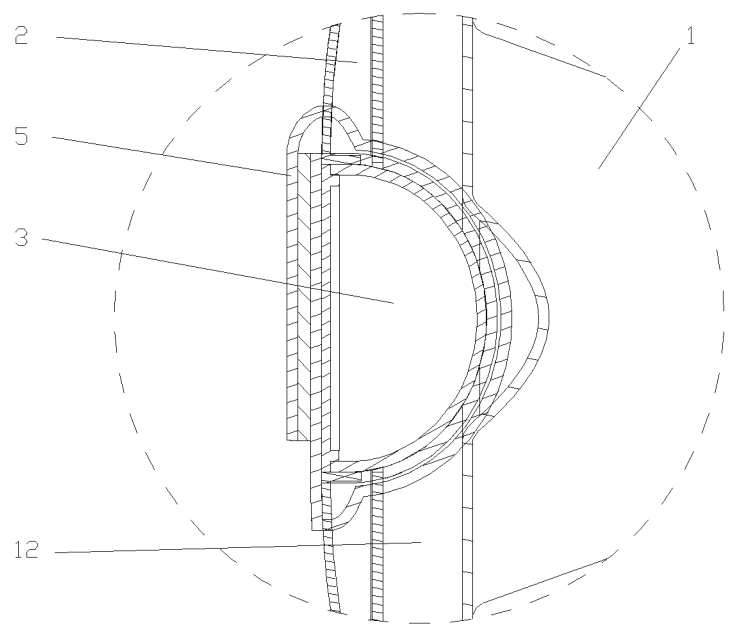
FIG. 21 is a partial enlarged schematic diagram at F in FIG. 18.
Figure 22:
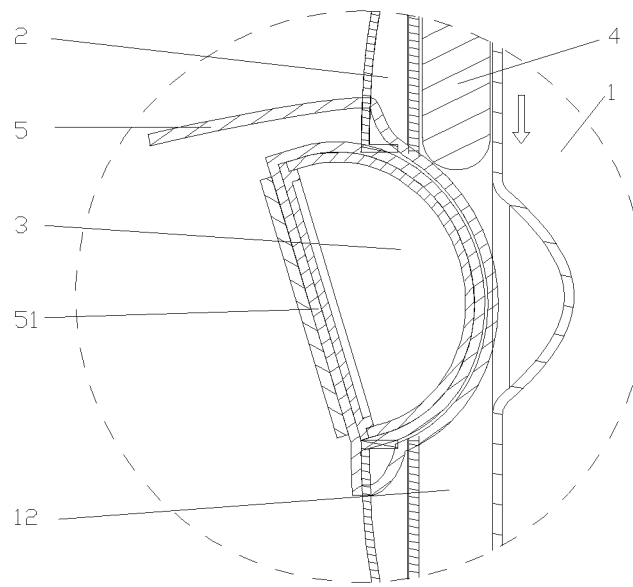
FIG. 22 is a schematic diagram of the take-out process at F in FIG. 18.
Figure 23:
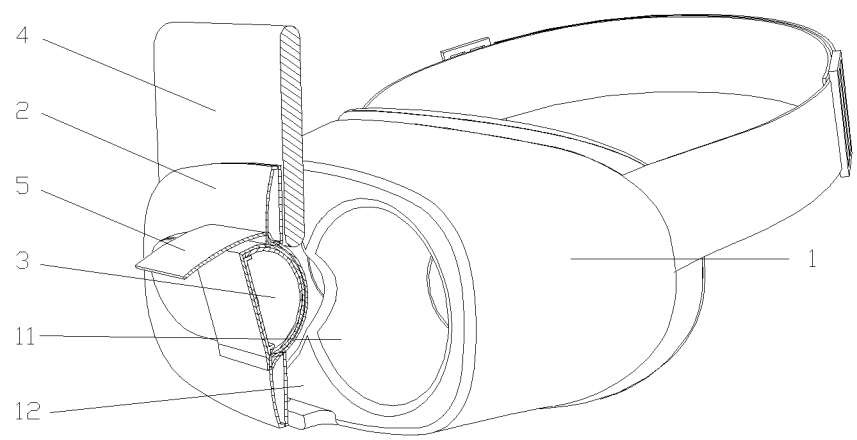
FIG. 23 is a schematic partial cross-sectional structural and diagram of embodiment 5.

In some embodiments, such as in the embodiment 5 shown in FIGS. 21-23, the head-mounted display device further comprises a strap 5. The remote controller 3 is fixed on the front cover 2 by a strap 5. The strap 5 may be fixed or the front cover 2, for example, an elastic band fixed on one side of the front cover 2 away from the display end 11. The remote controller 3 extends into the through hole 21 from an area that is never covered by the elastic band. It may also be detachable and is not limited in this application.

In some embodiments, the strap 5 is detachable. The perforation holes are provided on the two opposite sides of the through hole 21. One end of the strap 5 goes in through one perforation hole and goes out through another perforation hole. The two ends of the strap 5 are fixedly connected, thus enclosing and fixing the remote controller 3 in the through hole 21. When taking out the remote controller 3, both ends of the strap 5 are untied to take out the remote controller 3. In some embodiments, as shown in FIG. 22, the perforation holes are spaced arranged on both sides of the through hole 21 along an insertion direction of the display 4. One end of the strap 5 respectively goes out through a first perforation hole and goes in through a second perforation hole along the insertion direction of the display 4.

Further, as shown in embodiment 5, one end of the strap 5 is provided with a fixing sleeve 51 that matches with the cross section of the remote controller 3, and is sleeved on the remote controller 3, such that the remote controller 3 can be fixed to the strap 5. Further, after another end of the strap 5 goes in through one perforation hole and goes out through another perforation hole, fixing both ends can firmly fix the remote controller 3 in the through hole 21.

Further, the both ends of the strap 5 can be fixedly connected by a Velcro or a buckle.

In some other embodiments, the strap 5 may also cooperate with some other fixing mechanisms to further fix the remote controller 3, and for example, in conjunction with the above-mentioned fixing method of the damping member 110, the remote controller 3 can be effectively fixed to prevent the remote controller 3 from shaking in the through hole 21.

The present disclosure also provides a method for taking out a remote controller in the head-mounted display device described above. The remote controller 3 is disposed in a through hole 21 and located on an insertion route of a display 4, comprising the following steps:
  unfixing the remote controller 3;
  inserting the display 4 along the gap 12;
  abutting the display 4 and the remote controller 3, to drive the remote controller 3 to leave the through hole 21.

For example: a taking out step in embodiment 1: firstly, inserting the display 4 along the gap 12; then, toggling the toggle member 15, by the display 4, to drive the sliding pin 13 away from the remote controller 3 for unfixing; then, abutting the display 4 and the remote controller 3, to drive the remote controller 3 to rotate in a direction away from the display end 11 by taking the rotating portion 17 as an axis; and finally, manually separating the remote controller 3 from the rotating portion 17.

A taking out step in embodiment 2: firstly, manually driving the pushing member 16 to drive the sliding pin 13 away from the remote controller 3 for unfixing; then, inserting the display 4 along the gap 12; then, abutting the display 4 and the remote controller 3, to eject the remote controller 3 from the through hole 21.

Another taking out step in embodiment 2: firstly, inserting the display 4 along the gap 12; then, manually driving the pushing member 16 to drive the sliding pin 13 away from the remote controller 3; then, abutting the display 4 and the remote controller 3, to eject the remote controller 3 from the through hole 21.

A taking out step in embodiments 3 and 4: firstly, inserting the display 4 along the gap 12; then, abutting the display 4 and the remote controller 3, to eject the remote controller 3 from the through hole 21 and unfix the remote controller 3 simultaneously.

A taking out step in embodiment 5: firstly, unfixing both ends of the strap 5 to unfix the remote controller 3; then, inserting the display 4 along the gap 12; then, abutting the display 4 and the remote controller 3, to drive the remote controller 3 to rotate out from the through hole 21 by taking the below perforation hole as an axis.

In some other embodiments, those skilled in the art can take out the remote controller in different sequence of Steps according to different fixing forms, as long as the insertion process of the display 4 is combined and linked with the take-out process of the remote controller 3 to improve the preparation efficiency of the head-mounted display device. This application does not limit the sequence of specific steps.

Although some specific embodiments of the present disclosure have been described in detail through examples, those skilled in the art should understand that the above examples are only for illustration and not for limiting the scope of the present disclosure. Those skilled in the art should understand that the above embodiments can be modified without departing from the scope and spirit of the present disclosure. The scope of the present disclosure is defined by the appended claims.

The invention claimed is:

1. A head-mounted display device, comprising a device body, a front cover and a remote controller,
  wherein a first end of the device body is a display end, the front cover is disposed on the device body and is positioned opposite to the display end, and the front cover and the display end are adapted to provide a display to be inserted therebetween when in use,
  wherein the front cover is provided with a through hole opposite to the display end, which is adapted to receive and fix the remote controller,
  wherein the front cover is movably connected to the device body, and the front cover is adapted for movement between a storage position proximate to the display end and a working position distal from the display end,
  wherein a gap is provided between the front cover and the display end, and the gap is adapted for receiving the display when the front cover is in the working position, and
  wherein a reset member is further disposed between the front cover and the device body, which is adapted to drive the front cover to slidably move from working position toward the storage position.

2. The head-mounted display device according to claim 1, wherein at least the front cover is provided with a chamfer on one side opposite to an insertion direction of the display, such that when the display is inserted into the gap, the display moves the front cover to a working position by driving the chamfer.

3. The head-mounted display device according to claim 1, wherein, when the remote controller is fixed in the through hole, the remote controller protrudes from the front cover on one side facing the display end and is located on an insertion route of the display.

4. The head-mounted display device according to claim 3, wherein one side of the remote controller facing the display end is provided with a matching portion that matches with the display and is located on the insertion route of the display, such that when the display is inserted into the gap, the display pushes the remote controller away from the through hole by driving the matching portion.

5. The head-mounted display device according to claim 3, wherein at least one side of the through hole is provided with a sliding pin mechanism, and a sliding pin of the sliding pin mechanism is slidably arranged on the front cover, wherein the sliding pin mechanism further comprises a toggle member, and wherein one end of the toggle member which is connected to the sliding pin faces the display end and is located on the insertion route of the display, such that when the display is inserted, the toggle member drives the sliding pin to slide in a direction away from the through hole.

6. The head-mounted display device according to claim 1, wherein a matching portion is symmetrically arranged on one side of the remote controller facing the display end.

7. The head-mounted display device according to claim 1, wherein an avoidance portion is provided on the display end and the avoidance portion avoids the remote controller.

8. The head-mounted display device according to claim 1, wherein the through hole conforms to a shape of the remote controller, and the remote controller is fixed in the through hole to close the through hole.

9. The head-mounted display device according to claim 1, wherein at least one side of the through hole is provided with a sliding pin mechanism, and a sliding pin of the sliding pin mechanism is slidably arranged on the front cover, such that when the remote controller is fixed in the through hole, the remote controller is locked by the sliding pin which is inserted into a first portion of the remote controller.

10. The head-mounted display device according to claim 1, wherein at least one side of the through hole is provided with a sliding pin mechanism, and a sliding pin of the sliding pin mechanism is slidably arranged on the front cover, and wherein one end of the sliding pin that locks the remote controller has an inclined surface or an arc surface and is matched with one side of the remote controller facing the display end, such that when the inclined surface or arc surface intersects an installation direction of the remote controller, the remote controller drives the inclined surface or the arc surface to slide the sliding pin in a direction away from the through hole.

11. The head-mounted display device according to claim 1, wherein at least one side of the through hole is provided with a sliding pin mechanism, and a sliding pin of the sliding pin mechanism is slidably arranged on the front cover, and wherein the sliding pin mechanism comprises an elastic member which is disposed in the front cover to drive the sliding pin to slide into the through hole under an action of elastic force.

12. The head-mounted display device according to claim 1, wherein at least one side of the through hole is provided with a sliding pin mechanism, and a sliding pin of the sliding pin mechanism is slidably arranged on the front cover, and wherein the sliding pin mechanism comprises a toggle member which is rotatably connected in the front cover and connected with the sliding pin, and rotation of the toggle member drives the sliding pin to slide.

13. The head-mounted display device according to claim 1, wherein at least one side of the through hole is provided with a sliding pin mechanism, and a sliding pin of the sliding pin mechanism is slidably arranged on the front cover, wherein a pushing member is provided on the front cover, and wherein the pushing member is exposed, and the pushing member is connected with the sliding pin and capable of driving the sliding pin to slide.

14. The head-mounted display device according to claim 1, wherein sliding pin mechanisms are symmetrically arranged on two opposite sides of the through hole.

15. The head-mounted display device according to claim 1, wherein at least one side of the through hole is provided with a damping member, the remote controller is located in the through hole, and the remote controller is fixed by an action force generated between the damping member and the remote controller.

16. The head-mounted display device according to claim 1, further including a limiting mechanism between the through hole and the remote controller, adapted to limit a position where the remote controller is disposed in the through hole.

17. The head-mounted display device according to claim 1, wherein a damping member which is a rubber layer or a silicone layer is provided.

18. The head-mounted display device according to claim 1, wherein a damping member is annularly provided on an inner side of the through hole.

\* \* \* \* \*